US006683849B1

(12) United States Patent
Langridge et al.

(10) Patent No.: US 6,683,849 B1
(45) Date of Patent: Jan. 27, 2004

(54) OPTICAL COMMUNICATIONS NETWORK

(75) Inventors: Dave Langridge, Stansted (GB); Evert E Deboer, Nepean (CA); Peter W Phelps, Nepean (CA); Joseph Olajubu, Canvey Island (GB)

(73) Assignee: Nortel Networks Limited, St. Laurent (CA)

( * ) Notice: Subject to any disclaimer, the term of this patent is extended or adjusted under 35 U.S.C. 154(b) by 712 days.

(21) Appl. No.: 09/642,121

(22) Filed: Aug. 18, 2000

(51) Int. Cl.$^7$ .............................................. H04L 12/437
(52) U.S. Cl. ........................................................ 370/223
(58) Field of Search .................................. 370/223, 222, 370/227, 228; 340/825.01, 825.16, 827; 398/4

(56) References Cited

U.S. PATENT DOCUMENTS

| | | | |
|---|---|---|---|
| 5,440,540 A | * | 8/1995 | Kremer |
| 5,491,686 A | * | 2/1996 | Sato |
| 5,537,393 A | | 7/1996 | Shioda et al. |
| 5,661,720 A | * | 8/1997 | Taniguchi ................... 370/223 |
| 5,909,175 A | * | 6/1999 | Yamasaki et al. ........... 340/506 |
| 6,226,111 B1 | * | 5/2001 | Chang et al. ............... 359/111 |
| 6,598,092 B2 | * | 7/2003 | Tomizawa et al. .......... 709/251 |
| 6,606,667 B1 | * | 8/2003 | Hermann .................... 709/239 |
| 2002/0141334 A1 | * | 10/2002 | Deboer et al. |
| 2003/0065811 A1 | * | 4/2003 | Lin et al. |

FOREIGN PATENT DOCUMENTS

| | | | |
|---|---|---|---|
| EP | 0 994 635 A1 | 4/2000 | .......... H04Q/11/04 |
| WO | WO 99/23773 | 5/1999 | ......... H04B/10/213 |

OTHER PUBLICATIONS

Mayer M: "First Draft of G. ASON" Contribution to T1 Standards Project, XX, XX, Mar. 21, 2000, pp. 1–14, XP000931271, p. 3, paragraph 1.

* cited by examiner

Primary Examiner—Kenneth Vanderpuye
(74) Attorney, Agent, or Firm—Barnes & Thornburg

(57) ABSTRACT

The working fibre and protection fibre between pairs of nodes are shared between adjacent rings in a network, such that working traffic on the working fibre between the pair of nodes can be protected by the ring architecture of either of adjacent rings. A network management system routes signals across the network and dictates which rings within the network provide protection for the signal route. The ring structure enables protection for signal traffic on a ring to be protected by the ring protocols, providing rapid protection switching. It is also possible to select the location of protection bandwidth for a signal path across the network. In this way, protection bandwidth is shares and can also be configured to optimise the use of the total available protection bandwidth.

12 Claims, 1 Drawing Sheet

OPTICAL COMMUNICATIONS NETWORK

FIELD OF THE INVENTION

This invention relates to an optical communications network which is defined by a number of interconnected nodes. The invention is particularly directed to a network in which protection paths are provided, which enable communication between pairs of nodes despite rupture of the main signal carrying fibre between those nodes.

BACKGROUND OF THE INVENTION

There are various known architectures for providing signal protection. One possible way to provide a protection path between nodes is, for each adjacent pair of nodes of the network, to provide an additional protection cable between the pair of nodes which preferably follows a different path around the network to the main signal carrying fibre joining those nodes. This ensures that the protection cable is not susceptible to the same failure as the main cable. This type of dedicated protection scheme results in a large number of additional cables extending around the network, and these additional cables are normally unused. This approach is therefore bandwidth inefficient, although it is extremely simple to implement.

A known improvement to this approach is a ring configuration it which adjacent nodes are connected together by pairs of cables—a working cable and a protection cable. This enables the protection channels to be shared. This configuration has been considered for coupling nodes together which are each arranged to add or drop signals in standard SONET format to or from the network. The signals are provided from the service platform on two channels—a working channel and a protection channel. The nodes enable electrical switching of the entire signal carried by the working fibres onto the protection cables. This enables a span switch (in which for one section of the network between adjacent nodes, the protection fibre is employed instead of the main fibre) or a ring switch (in which signals for communication between adjacent nodes are redirected all around the network using the protection cables) to be implemented.

It is also known to couple nodes in a ring via two multiplexed communication paths providing for transmission in opposite directions around the ring. In normal operation communications are effected between the nodes in both directions via the two paths.

In the presence of a fault such as a fiber cut, this is detected in the two nodes immediately adjacent to the fault, and communications are maintained via both paths forming a folded loop, signals being coupled between the paths at these two nodes adjacent to the fault. Such systems are known as bidirectional line switched ring (BLSR) systems, and typically serve for communicating SONET signals in which case they are commonly referred to as SONET ring systems.

The switching operation in a BLSR ring requires low computational overhead. Many BLSR rings can be coupled together to define a network, and for a signal path across the network, each ring within the path provides the protection switching for that part of the signal path. When such rings are connected together, the nodes in adjacent rings are typically connected together using the tributary connections of the nodes. This means that the working and protection paths of each ring are maintained, and switching of signals between rings takes place at the nodes. U.S. Pat. No. 5,159,595 describes the BLSR architecture is detail and is incorporated herein as reference material.

In order to route a signal across such a network, a switching operation is carried out at the nodes, and protection is the automatic result of the ring structure. In other words, each span between nodes of the signal path is associated with a specific ring, which provides the protection capability.

BLSR systems have disadvantages in that they have a high utilization of optical fibers and do not provide for 1:N (N>1) protection (i.e. protection of N working channels using one protection channel).

Mesh based network architectures are also known, which minimise the amount of spare capacity required by allowing the spare capacity on one span to contribute to the protection of other spans. Such architectures are more efficient in their use of protection bandwidth. Intelligent switching and routing operations are required to implement the protection in the event of one or more failures, and such systems are extremely computationally intensive. Mesh based architectures also require more expensive hardware, as large multiple-input/output optical switches are required. Furthermore, the response to failures is slow as a result of the required computation.

There is therefore a need for a network architecture which benefits from the shared protection capability of MESH structures, but which avoids the increased computational overhead, and preferably maintains a level of computational complexity and switching response time in line with ring-based protection systems.

SUMMARY OF THE INVENTION

According to a first aspect of the invention, there is provided a communications network comprising a plurality of nodes, which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, the network further comprising a network management system for routing of signals across the network, wherein the network management system dictates which rings within the network provide protection for the signal route.

The network of the invention has a ring structure, which enables protection for signal traffic on a ring to be protected by the ring architecture. Working and protection paths are shared between adjacent rings. This means it is possible for either ring to provide the protection for that path. The invention makes it possible to select the location of protection bandwidth for a signal path across the network. In this way, protection bandwidth is shared, and can also be configured to optimise the use of the total available protection bandwidth. The computational overhead required to control the provision of protection is low, because protection is based on local ring architectures within the network. However, the network is very adaptable, providing efficiency improvements, similar to MESH architectures.

Preferably, each ring defined within the network operates locally according to the BLSR protocol. The BLSR protocol, which uses K-byte SONET/SDH signalling then provides the required protection switching.

The traffic across the network may be operated on a time division multiplex basis, and a protection path may be defined in respect of individual time slots. To achieve this, K bytes for each time slot (the so-called "STS" in the SONET standard) can be used for the signalling. This provides protection path switching at the granularity of the individual signal paths, rather that at the line level (as in conventional BLSR rings). Alternatively, the traffic across the network may again be operated on a time division multiplex basis, and a protection path may instead be defined in respect of a group of time slots. This enables simpler hardware to be implemented.

According to a second aspect of the invention, in a network comprising a plurality of nodes, which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, there is provided a method of routing signals across the network, the method comprising:

determining a signal path between first and second nodes in the network, the path comprising path sections between nodes;

for each path section having working and protection fibres shared between rings within the network, specifying which of those rings is to provide protection for that path section.

Each path section in the network is allocated to a specific ring in the network, providing simple ring-type protection switching.

According to a third aspect of the invention, in a network comprising a plurality of nodes, which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, there is provided a method of routing signals across the network, the method comprising:

determining a signal path between first and second nodes in the network, defining the signal path as a plurality of ring sections, wherein each ring section is a part of a defined ring of nodes;

for each ring section, specifying the route of a protection path for that ring section.

In this method, larger rings may be defined within the network, so that the overall level of protection bandwidth required can be reduced.

BRIEF DESCRIPTION OF THE DRAWINGS

Examples of the invention will now be described in detail with reference to the accompanying drawings, in which.

DETAILED DESCRIPTION OF THE INVENTION

Figure 1:
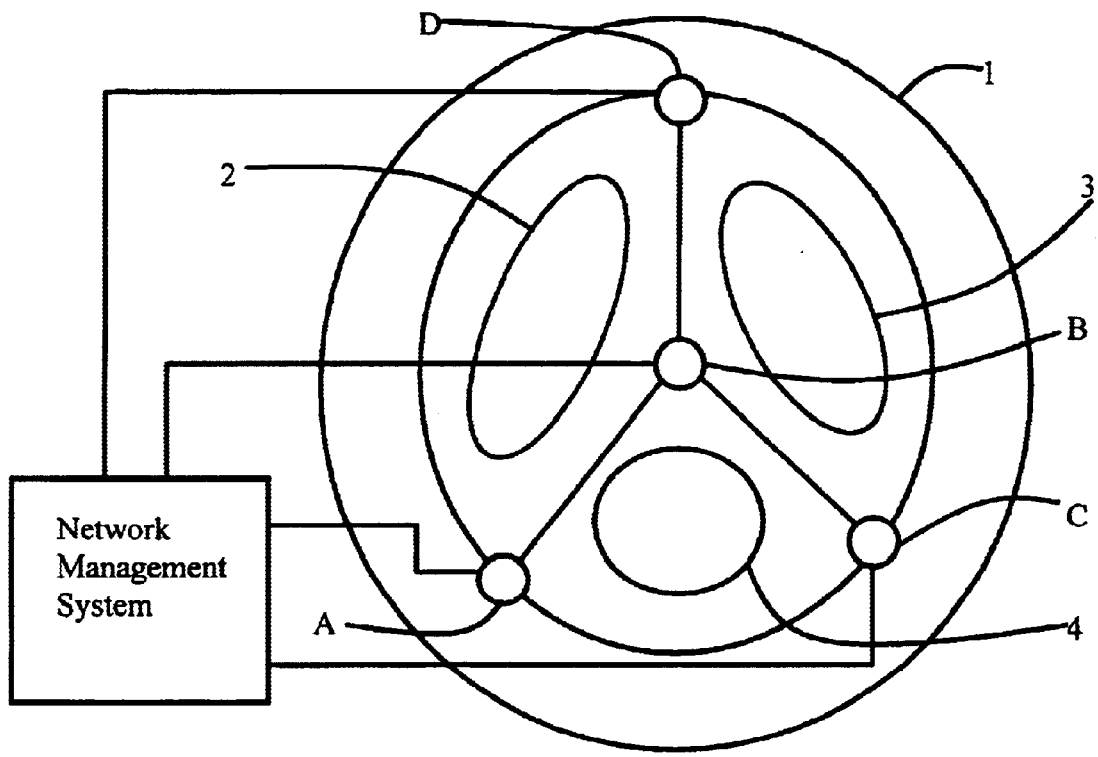
FIG. 1 shows a simplified network configuration for explaining the invention.

FIG. 1 shows a network comprising four nodes A to D, and which may be considered to comprise four rings 1, 2, 3, 4. A simple network architecture is represented to simplify the explanation of the invention, which of course will in practice be implemented in a network comprising many more nodes, for example tens or hundreds of nodes.

Each ring of nodes comprises at least one working fibre and at least one protection fibre between adjacent nodes in the ring. Adjacent pairs of nodes are shared between pairs of rings with the working fibre and protection fibre between the pair of nodes shared between the two rings. For example, the adjacent pair of nodes A and B is shared between the two rings 2 and 4. Working traffic on the working fibre between the pair of nodes A,B can be protected by the ring architecture of either of the two rings of nodes 2,4.

In a conventional BLSR network, the nodes in adjacent rings are typically connected together using the tributary connections of the nodes. Thus, node A would be implemented as two node devices, for example add drop multiplexers (ADMs), coupled together at their tributaries. Thus, the provision of a path through the network determines the switching states of the nodes, and thereby determines where protection for each path will be available. If each ring is a four fibre BLSR ring, with four fibres between each adjacent pair of nodes, the conventional implementation of a large network using BLSR rings would provide eight fibres between the nodes A and B.

In accordance with the invention, the working fibres and protection fibres between the pair of nodes A and B are shared between the two rings 2, 4, such that working traffic on the working fibre between the pair of nodes can be protected by the ring architecture of either of the two rings of nodes. A fibre cut results in the ring 2 providing protection of working traffic between nodes A and B which was allocated protection bandwidth from the ring 2, and the ring 4 provides protection of working traffic between nodes A and B which was allocated protection bandwidth from the ring 4. This allows controllable allocation of protection bandwidth.

In particular, different parts of the network may operate at different data rates, so that different rings within the network will have different protection bandwidth, The ability to select the path which provides protection enables this capacity to be taken into consideration.

The creation of a connection across the network is controlled by a network management system (not shown). This system my have knowledge of the whole network and is thus able to calculate the shortest path through the network. Alternatively, an Automatically Switched Optical Network (ASON) may be implemented, which uses routing protocols to identify the sole or optimal path over which the data is to travel. The nodes then use this routing protocol between one another to calculate routes between them. Any suitable routing protocol may be used by the network management system in the network of the invention.

For example, in a link state routing protocol, each node in the network (for example, a router) maintains information about each link in the network. A topology state routing protocol is a refinement of link state protocol in which significant status about the internal structure or operation of other nodes in the network may be maintained in addition to information about links.

In an alternative route-discovery procedure within a network comprising a plurality of sub-networks, the source station issues a frame as an "all-paths explorer" packet that is received by each station on a local sub-networks, each routing device copies the frame and supplies information relating to the route and then distributes the copy to all interconnected nodes. Eventually, a copy of the broadcast explorer frame reaches every station on every sub-network of the network. Each station may respond to the source by issuing a response frame containing its address and the routing information. The source station examines the information contained in these response frames and selects (e.g., based on the round-trip time for return) a path to the intended destination.

In accordance with the invention, once the route across the network has been established, it is possible for the sender of the data to specify how protection will be provided. The sender may be able to specify for each link of the route (a link comprising a section of the route between adjacent nodes) which ring will provide protection for that link of the route. Alternatively, the sender may simply be given a choice of possible levels of protection. The network management system would then implement a protection scheme taking into account the protection bandwidths of the different rings in the network, and the allocation of other data connections to the protection bandwidth of those rings.

The invention can also enable the protection path to be selected on a data channel basis (data rate switching), rather than on a line basis (line rate switching). This is particularly appropriate for SONET/SDH systems, which operate a TDM (time division multiplex) allocation of channels to line bandwidth. SONET/SDH is synchronous system, and a limited bandwidth is available for signalling purposes, in the form of allocated bits in each data frame. The protection switching signalling is therefore required to be implemented using the available bandwidth for signalling in the existing SONET/SDH line overhead.

The SONET standards define two K-bytes in the line overhead, For an OC-192 line there is a K1 and a K2 defined for the first timeslot, the other 191 timeslots have equivalent bytes in the line overhead, but these are not defined by the standard. These additional bytes are used to provide the signalling bandwidth required by the invention. In conventional BLSR rings, the protection switching is carried out at the line rate level, so that a single pair of K bytes can be used to providing switching signalling for the entire traffic flow between nodes. However, the additional K-bytes, or each STS time slot, are available in the existing frame architecture.

Protection paths may be chosen for individual STS-1 time slots, or else blocks of a specified bandwidth, for example STS-12, could be allocated a single protection path. This reduces the complexity of the switching fabric. Different parts of the network may be provided with different bandwidth connections. For example, the connections between some nodes may support OC-192 traffic, whereas other connections may support only OC-12 traffic. The granularity of the protection switching may be different for different parts of the network.

Protocols for ring and span switching for each timeslot, or block of timeslots, as required by the invention, can follow the BLSR standards (GR-1230). K-byte signalling is used in the same way as BLSR, utilising the extra K-bytes defined above. In FIG. 1, suppose the link between A and B has an OC-192 link for working traffic and another for protection traffic. If timeslots 1–12 are defined to be in ring 2 and 13–24 in ring 4, then nodes A, B and D will communicate using tile K-bytes for time slots 1–12 and nodes A, B and C will communicate using the K-bytes for time slots 13–24.

According to the BLSR protocols, each node in a ring is given an Automatic Protection Switching ID (APS ID). For BLSR these are defined when the ring is set up. For the invention, the APS IDs for the rings can be defined when the network is set up, or when the connection is provisioned. These two options are explained further below:

If the APS IDs are set up when the network is set up, rings 1 to 4 of FIG. 1 are defined at set-up, with node maps and APS IDs sent to all nodes. For example, nodes A, B and C are provided with the IDs for ring 4, whereas node D is not. When a connection is provisioned on the link A–B, for example, the network manager has the choice of provisioning the connection on ring 2 or ring 4.

If the APS IDs are set up when a connection is provisioned, the ring is defined at that time. A connection on link A–B for ring 4 would be defined simply as A–B to enable timeslot allocation, whereas the ring 4 would be given for defining the protection path. The APS IDs are defined at this stage, either automatically or by the user.

Each node is provided with essentially local network information, and the protection switching is essentially triggered by the same mechanisms as in BLSR SONET rings. This means that protection switching can take place with minimum computational overhead, and therefore with the same time as for BLSR rings, namely within 50 ms of detection of a fault. This is much more rapid than a MESH network providing the same degree of shared protection.

When a protection path is unused within the network, it may be used for additional traffic, for example NUT (non-pre-emptable unprotected traffic).

It is described above that individual path sections between nodes may each be allocated to a local ring to provide protection. For example, if there is a connection path between nodes A and D through node B, ring 2 or 4 will be allocated as providing protection for path A–B whereas ring 2 or 3 will be allocated as providing protection for path B–D. It is instead possible for the protection pass to be defined less precisely.

Figure 2:
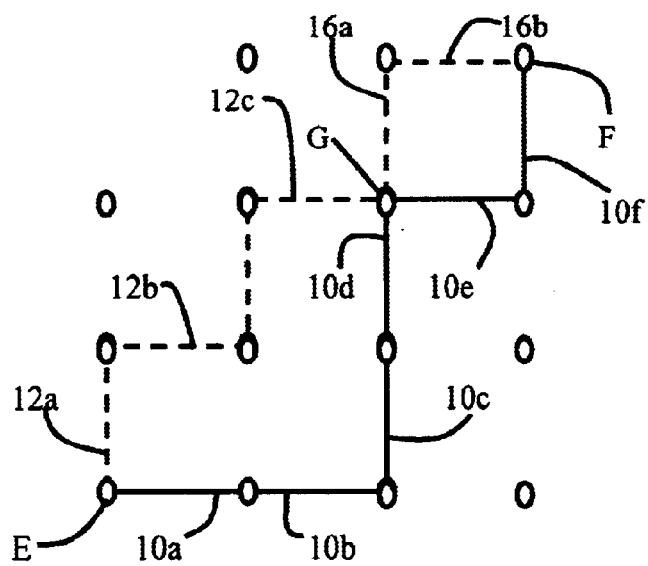
FIG. 2 shows a larger network configuration for explaining a variant of the invention.

FIG. 2 shows a network of nodes in which a path 10 has been selected between nodes E and F. In order to allocate less protection bandwidth to the path, the nodes in the path between E and an intermediate node G may be considered as part of a single ring. This single ring is defined as 10a, 10b, 10c, 10d, 12a, 12b, 12c. A failure in the path within this large ring will be protected by the BLSR architecture of the ring.

Protection for path 10e and 10f is provided by the ring 16a, 16b, 10e, 10f.

By defining larger rings within the network in this way, and providing BLSR ring-type protection locally, the invention enables flexibility in the allocation of protection bandwidth whilst maintaining the speed of response of ring protection. Instead of using the BLSR ring protection protocol locally, the so-called "Transoceanic Application" protocol (defined in G.841 Annex A) may be used. For protection against node failure, Ring Switched Matched Nodes can be used.

We claim:

1. A communications network comprising a plurality of nodes, which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, the network further comprising a network management system for routing of signals across the network, wherein the network management system dictates which rings within the network provide protection for the signal route.

2. A communications network as claimed in claim 1, wherein each ring defined within the network operates locally according to the BLSR protocol.

3. A communications network as claimed in claim 1, wherein the traffic across the network is operated on a time division multiplex basis, and wherein a protection path is defined in respect of individual time slots.

4. A communications network as claimed in claim 1, wherein the traffic across the network is operated on a time division multiplex basis, and wherein a protection path is defined in respect of a group of time slots.

5. A communications network as claimed in claim 1, wherein the network management system can provide different levels of protection for different signals.

6. In a network comprising a plurality of nodes, which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, a method of routing signals across the network, the method comprising:

determining a signal path between first and second nodes in the network, the path comprising path sections between nodes;

for each path section having working and protection fibres shared between rings within the network, specifying which of those rings is to provide protection for that path section.

7. In a network comprising a plurality of nodes, which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, a method of routing signals across the network, the method comprising:

determining a signal path between first and second nodes in the network, defining the signal path as a plurality of ring sections, wherein each ring section is a part of a defined ring of nodes;

for each ring section, specifying the route of a protection path for that ring section.

8. A communications network as claimed in claim 1, wherein the network management system applies routing protocols to implement an Automatically Switched Optical Network (ASON).

9. A plurality of nodes for use in a communications network, the nodes being arranged to define at least two rings of nodes within the network, adjacent nodes in each ring of nodes being connectable using at least one working fibre and at least one protection fiber, wherein at least one adjacent pair of nodes is shared between the two rings to enable the working fibre and protection fibre between the pair of nodes to be shared between the two rings, such that working traffic on the working fibre between the pair of nodes can be protected by the ring architecture of either of the two rings of nodes, the nodes further comprising a network management system for routing of signals across the network defined by the nodes, wherein the network management system dictates which rings within the network provide protection for the signal route.

10. A plurality of nodes as claimed in claim 9, wherein the network management system applies routing protocols to implement an Automatically Switched Optical Network (ASON).

11. A network management system for controlling the routing of signals across a communications network, the network comprising a plurality of nodes which define at least two rings of nodes within the network, each ring of nodes comprising at least one working fibre and at least one protection fibre between adjacent nodes in the ring, wherein at least one adjacent pair of nodes is shared between the two rings with the working fibre and protection fibre between the pair of nodes shared between the two rings, such that working traffic on the working fibre between the pair of nodes can be protected by the ring architecture of either of the two rings of nodes, wherein the network management system dictates which rings within the network provide protection for the signal route.

12. A network management system as claimed in claim 11 which applies routing protocols to implement an Automatically Switched Optical Network (ASON).

* * * * *